US009092707B2

(12) United States Patent
Slavin et al.

(10) Patent No.: US 9,092,707 B2
(45) Date of Patent: *Jul. 28, 2015

(54) CUSTOMIZING BARCODE IMAGES FOR PARTICULAR DISPLAYS

(71) Applicant: Codebroker, LLC, Belmont, MA (US)

(72) Inventors: Daniel Slavin, Belmont, MA (US); Pero Smrzlic, Leesburg, VA (US)

(73) Assignee: CodeBroker, LLC, Belmont, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,397

(22) Filed: May 19, 2014

(65) Prior Publication Data
US 2014/0252097 A1    Sep. 11, 2014

Related U.S. Application Data

(63) Continuation of application No. 12/296,329, filed on Oct. 7, 2008, now Pat. No. 8,736,615, which is a continuation-in-part of application No. PCT/US2007/010270, filed on Apr. 27, 2007.

(60) Provisional application No. 60/795,505, filed on Apr. 27, 2006.

(51) Int. Cl.
*G06K 19/06* (2006.01)
*F21V 8/00* (2006.01)
*G06Q 20/32* (2012.01)
(Continued)

(52) U.S. Cl.
CPC .......... *G06K 19/06112* (2013.01); *G02B 6/006* (2013.01); *G06K 1/12* (2013.01); *G06K 7/1095* (2013.01); *G06K 19/06028* (2013.01); *G06Q 20/3274* (2013.01)

(58) Field of Classification Search
CPC . G02B 6/006; G06Q 20/3274; G06K 7/1095; G06K 19/06112; G06K 7/10
See application file for complete search history.

(56) References Cited

U.S. PATENT DOCUMENTS 5,512,739 A    4/1996    Chandler
5,979,768 A    11/1999   Koenck
(Continued)

FOREIGN PATENT DOCUMENTS

WO    2004/027662    4/2004
WO    2006/128094    11/2006
WO    2007/127385    11/2007

OTHER PUBLICATIONS

Final Office Action, received in U.S. Appl. No. 11/765,096, mailed Dec. 2, 2011.
(Continued)

*Primary Examiner* — Thien M Le
*Assistant Examiner* — Asifa Habib

(57) ABSTRACT

Techniques for ensuring maximum readability of barcodes displayed in pixel displays. The techniques use the characteristics of the pixel display to determine the form of the barcode in the pixel display. Determination of the form includes determining a size of the barcode which renders the barcode's elements easily readable by a barcode reader and a shape, and or orientation of the barcode in the display which permits the entire barcode to be displayed in the display. Additionally, in a barcode with redundant information, the amount of redundant information may be reduced in the displayed barcode. The techniques may be applied to both one-dimensional and two-dimensional barcodes.

27 Claims, 6 Drawing Sheets

(51) Int. Cl.
*G06K 1/12* (2006.01)
*G06K 7/10* (2006.01)

(56) References Cited

U.S. PATENT DOCUMENTS

| | | | |
|---|---|---|---|
| 6,034,379 | A | 3/2000 | Bunte |
| 6,094,509 | A | 7/2000 | Zheng |
| 6,313,732 | B1 | 11/2001 | DeLuca |
| 6,386,671 | B1* | 5/2002 | Huston et al. ............... 347/16 |
| 6,446,868 | B1 | 9/2002 | Robertson |
| 6,565,003 | B1 | 5/2003 | Ma |
| 6,631,840 | B1 | 10/2003 | Muramatsu |
| 6,708,884 | B1 | 3/2004 | Su |
| 6,862,575 | B1 | 3/2005 | Anttila |
| 6,997,384 | B2 | 2/2006 | Hara |
| 7,108,187 | B2 | 9/2006 | Turvy |
| 7,121,469 | B2 | 10/2006 | Dorai |
| 7,181,066 | B1 | 2/2007 | Wagman |
| 7,270,273 | B2 | 9/2007 | Barber |
| 7,428,079 | B2 | 9/2008 | Barber |
| 7,603,320 | B1 | 10/2009 | Shu |
| 7,624,916 | B2 | 12/2009 | Sato |
| 7,702,162 | B2 | 4/2010 | Cheong |
| 7,980,467 | B2 | 7/2011 | Silverbrook |
| 8,447,283 | B2 | 5/2013 | Gravel |
| 2001/0047517 | A1 | 11/2001 | Christopoulos |
| 2002/0046262 | A1 | 4/2002 | Heilig |
| 2002/0070278 | A1* | 6/2002 | Hung et al. ............ 235/472.01 |
| 2002/0091569 | A1 | 7/2002 | Kitaura |
| 2002/0104884 | A1 | 8/2002 | Meier |
| 2003/0066883 | A1 | 4/2003 | Yu |
| 2003/0074259 | A1 | 4/2003 | Slyman, Jr. |
| 2003/0115152 | A1 | 6/2003 | Flaherty |
| 2003/0144035 | A1 | 7/2003 | Weinblatt |
| 2004/0011872 | A1 | 1/2004 | Shimizu |
| 2004/0012569 | A1 | 1/2004 | Hara |
| 2004/0019792 | A1 | 1/2004 | Funamoto |
| 2004/0026508 | A1 | 2/2004 | Nakajima |
| 2004/0039919 | A1 | 2/2004 | Takayama |
| 2004/0099741 | A1 | 5/2004 | Dorai |
| 2004/0195332 | A1 | 10/2004 | Barber |
| 2005/0121521 | A1 | 6/2005 | Ghai |
| 2005/0131761 | A1 | 6/2005 | Trika |
| 2005/0167504 | A1 | 8/2005 | Meier |
| 2005/0237204 | A1* | 10/2005 | Burman et al. ............ 340/572.8 |
| 2006/0064600 | A1 | 3/2006 | Polichetti |
| 2006/0165060 | A1 | 7/2006 | Dua |
| 2007/0095909 | A1 | 5/2007 | Chaum |
| 2007/0168943 | A1 | 7/2007 | Marini |
| 2007/0204025 | A1 | 8/2007 | Cox |
| 2008/0162497 | A1 | 7/2008 | Lim |
| 2008/0210754 | A1 | 9/2008 | Lovett |
| 2009/0006254 | A1 | 1/2009 | Mumm |
| 2013/0197997 | A1 | 8/2013 | Ross |

OTHER PUBLICATIONS

Final Office Action, received in U.S. Appl. No. 11/765,096, mailed Jun. 23, 2010.

Final Office Action, received in U.S. Appl. No. 12/371,130, mailed Nov. 25, 2011.

International Preliminary Report on Patentability, received in International PCT Application No. PCTUS2006020659 mailed Jul. 6, 2007.

International Preliminary Report on Patentability, received in International PCT Application No. PCTUS2007010270 mailed Oct. 28, 2008.

International Search Report and Written Opinion, received in International PCT Application No. PCTUS2006020659 mailed Sep. 20, 2006.

International Search Report and Written Opinion, received in International PCT Application No. PCTUS2007010270 mailed Jul. 3, 2008.

Office Action, received in U.S. Appl. No. 11/765,096, mailed Dec. 10, 2009.

Office Action, received in U.S. Appl. No. 11/765,096, mailed May 15, 2009.

Office Action, received in U.S. Appl. No. 11/765,096, mailed Mar. 1, 2011.

Office Action, received in U.S. Appl. No. 12/371,130, mailed Feb. 18, 2011.

Office Action, received in U.S. Appl. No. 12/371,130, mailed May 25, 2012.

* cited by examiner

Figure 1
Background Images
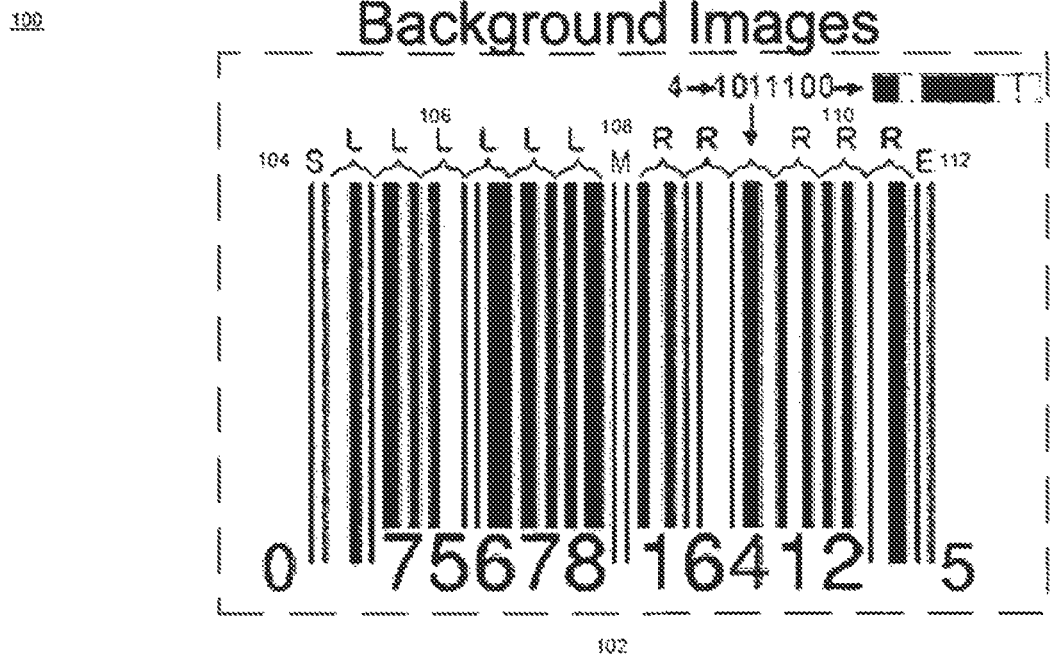
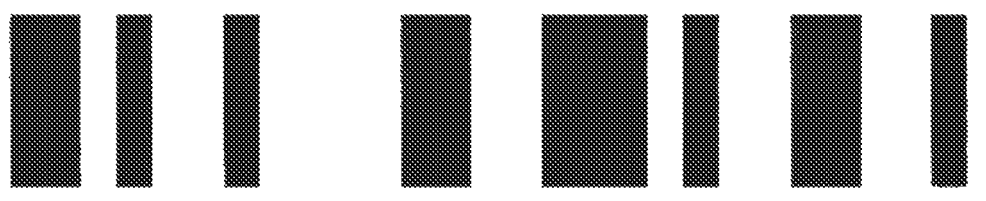
Standard Barcode
114
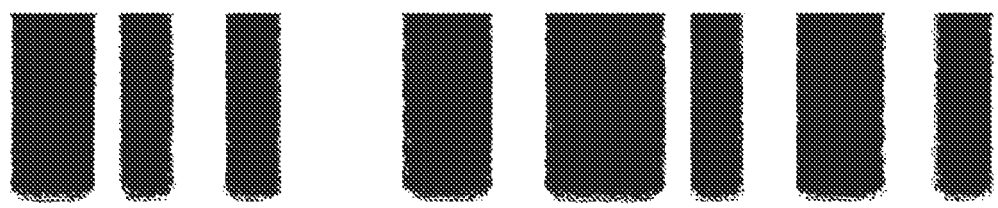
Anti-Aliased Barcode
116
121
118

Figure 4
Barcode Manipulations
402
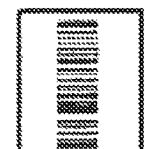
404
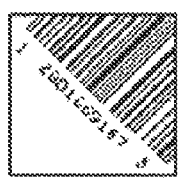
406
408
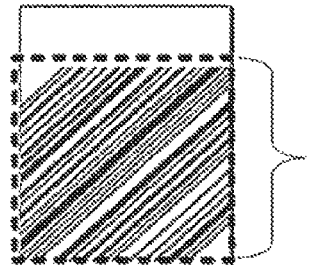
410
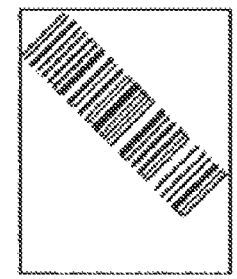
412
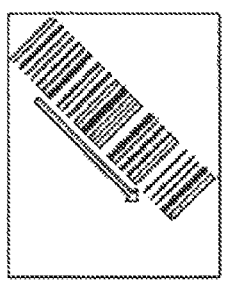
414

Figure 6
Sample Optimization for Data Matrix Barcode with Data "DataMatrix ECC200"
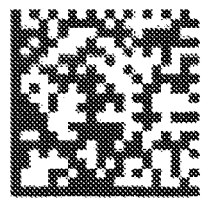
20 x 20 can carry a maximum of 20 bytes of data
12 x 36 can carry a maximum of 20 bytes of data
12 x 36 rotated 90 degrees can carry a maximum of 20 bytes of data
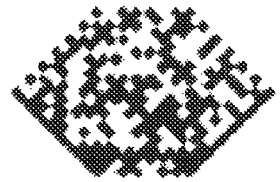
Shorter than 20 x 20
Narrower than 12 x 36
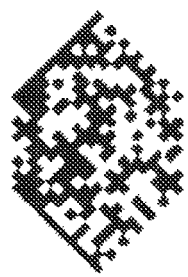
Shorter than 12 x 36
Narrower than 20 x 20
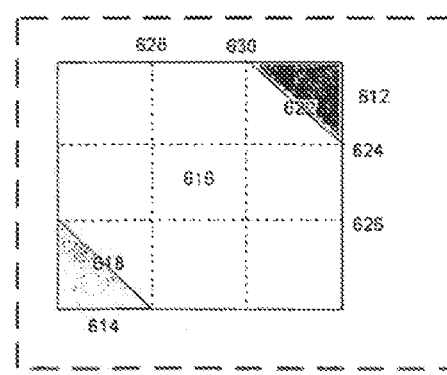

CUSTOMIZING BARCODE IMAGES FOR PARTICULAR DISPLAYS

CROSS-REFERENCE TO RELATED APPLICATIONS

This application is a continuation of U.S. patent application Ser. No. 12/296,329, to be issued as U.S. Pat. No. 8,736,615 on May 27, 2014, which is a continuation-in-part application of International Application No. PCT/US07/10270, filed on Apr. 27, 2007, which in turn claims priority to U.S. provisional patent application No. 60/795,505, entitled "Customizing barcode images for particular displays", filed on Apr. 27, 2006. The international application and U.S. provisional application are incorporated into the present patent application by reference for all purposes.

BACKGROUND OF THE INVENTION

1. Field of the Invention

The present invention relates to systems in which transactions are performed by displaying a barcode on a device that is not part of a point of sale system. In most cases these devices will be portable or mobile in nature such as a cellular telephone. The point of sale system will read the displayed barcode from the device.

2. Description of Related Art

Barcodes Generally: FIG. 1

In a barcode, information is encoded as a set of light and dark elements which are arranged in a predetermined manner. At 102 in FIG. 1 is shown a one-dimensional barcode in which the elements are light and dark stripes. FIG. 1 further displays a number of images that are helpful to explain how barcodes are created. Definitions of and methodologies for how 1-dimensional and 2-dimensional barcodes must be rendered are well known and can be found in a number of locations. An example detailing how 1-dimensional UPC barcodes are created is described at the Web page referenced by http://en.wikipedia.org/wiki/UPC_code. UPC barcode (102) uses light and dark stripes to encode 12 decimal digits as S LLLLLLMRRRRRRE. The light and dark stripes are made up of light and/or dark elements of equal size. If an element in a stripe is light, it is described in the following as having the value 0; if it is dark, it is described as having the value 1.

Beginning with portions S (start 104) and E (end 112) of the UPC code, S and E are represented by elements having the pattern 101, i.e., a dark element followed by a light element followed by a dark element. M (middle 108) is represented by elements having the pattern 01010 (called guard bars), and the twelve digits are broken into two sets of 6 digits represented by 6 L (left 106) digits and 6 R (right 110) digits, where each of the 6 L digits and 6 R digits are represented by seven elements. For example, the digit "4" is represented by elements having the pattern 1011100.

The limitations of barcode readers impose two critical dimensions on 1-dimensional barcodes: a minimum height for the barcode and a minimum width for the barcode's elements.

The minimum height is the height that the barcode must have in order for a barcode reader to be able to accurately read it. The minimum height is dependent upon the capabilities of the barcode reader being utilized and is often described in best practices for using a particular barcode type. In some cases, such as in the case of barcodes used by postal systems, the barcode standard specifies a very specific minimum height.

The minimum width for a barcode's elements is the minimum width that an element of the barcode must have to be accurately read by a barcode reader. For reasons that will be explained in the following, when a barcode is displayed in a pixel display device, the minimum element width must be an integer number of pixels.

Problems of Displaying Barcodes on Electronic Displays

Electronic displays typically contain display elements called pixels. Any images which are rendered on such electronic displays must be rendered as a set of whole pixels. For example, it is not possible to render an image which is 2.5 pixels wide (or high). The display must render the image as 2 pixels or 3 pixels wide (or high)

As is apparent from the foregoing, the elements of barcodes (both 1 dimensional and 2 dimensional) must be rendered using an integer number of pixels. The integer number of pixels must give the element a display width which is great enough for the barcode reader to read the element.

FIG. 1 also displays a number of images that are helpful to explain the effects of expansion of a barcode that is to be displayed on a pixel display.

Effect 1) The effect of antialiasing. Aliasing results whenever an image that cannot be expressed as an integer number of pixels is mapped onto a pixel display. Because of aliasing, lines and edges appear jagged to the eye instead of smooth. Anti-aliasing minimizes the effects of aliasing in images displayed in pixel displays. This effect is created by blending the jagged edge in to the background using a combination of the background color and the foreground color. In the case of a black barcode element next to a white bar code element, anti-aliasing will produce a gray area at the intersection of the black and white elements as shown in 116. Element 114 shows a barcode that has been magnified 12× and element 116 shows the same barcode that has been magnified 12.5× with antialiasing. Note that the edges of the bars are not smooth in 116. The fuzziness resulting from antialiasing makes it difficult or impossible for a barcode reader to successfully read the barcode.

Effect 2) The effect of expansions on element sizes. Element 118 shows a portion of a barcode consisting of 11 elements. The elements are 10110011101, where as before 1 represents a dark element and 0 a light element. When an image is expanded, the display rounds areas of the image with different colors to the nearest size in entire pixels. Thus, if the barcode portion shown at 118 has elements that are 1 pixel wide and is expanded 150%, a dark or light area that is one element wide (1 or 0) will become 2 pixels wide, while a dark or light area that is 2 elements wide (11 or 00) will become 3 pixels wide and a dark or light area that is 3 elements wide (111 or 000) will become 5 pixels wide. As a consequence, the elements of the displayed barcode now have different widths (2 pixels (2/1) when the area is 1 or 0, 1.5 pixels (3/2) when the area is 11 or 00, and 1⅔ pixels (5/3) when the area is 111 or 000). Barcode readers universally presume that all of the elements in the barcode have the same width, and consequently, the expansion of the barcode by 150% has rendered the barcode unreadable.

Effect 3) A third problem is that the elements of the barcode must have the minimum width that is required for the barcode reader to read the element. Typical readers for sale today require a minimum barcode element size of at least 8 mils (0.008"). The width in pixels of the barcode must thus be an integer number of the pixels used in the display device which results in an element that is at least as wide as the minimum width required for the reader. If a barcode is displayed with elements whose width in pixels is less than the minimum width, many barcode readers will not be able to read the barcode. On reflective displays such as LCD displays, the minimum width problem is further exacerbated by glass or plastic coatings which sit above the display device and which tend to distort both the light received from the barcode reader and the light produced by the display and thus to distort the image of the barcode.

As an example of the above, if a display is 1.0" wide×1.0" high and is 175 pixels in both width and height, then each pixel is 5.7 mils wide. This is a smaller element size than can be read by most barcode readers.

The net result then of Effects 1, 2, and 3 is that for a high resolution display such as the one described above (with many pixels per inch), rendering the barcode with elements whose display width is the width of a single pixel in the display will result in a barcode that has elements which are smaller than can be accurately read by a barcode reader (Effect 3). Simply increasing the size of the elements by an arbitrary amount will render the barcode unreadable because of the results described in Effects 1 and 2 above. Further, the amount by which the width in pixels of the barcode may be increased is limited by the requirement that the entire barcode must fit in the display.

Finally, because of Effects 1, 2, and 3, the code must be specifically generated for the displaying device so that the software which controls the display of graphics does not produce a display of the barcode which is subject to Effects 1 or 2 or no longer fits on the display device. In the case of two-dimensional barcodes, of course, both the height and width in pixels of the barcode's elements must be such that the display heights and widths of the elements are large enough so that the elements are read by the barcode reader.

Prior art has suggested i) the concept of customizing the appearance of barcodes based upon the size and color depth of a given display (U.S. published patent application 2003/0230630, Whipple, et al., Using mobile electronic devices to transfer data through dynamically generated scannable barcodes, published Dec. 18, 2003) and ii) mechanisms for creating a database of displays and their attributes in order to customize the appearance of a barcode for a particular display. (WO2004027662, MOBIQA LTD (GB); FORBES RONALD (GB), OPTIMISED MESSAGES CONTAINING BARCODE INFORMATION FOR MOBILE RECEIVING DEVICE, Apr. 1, 2004). However, these solutions do not address the issue of ensuring maximum readability of the displayed barcode.

BRIEF SUMMARY OF THE INVENTION

In one aspect of the invention, maximum readability of the barcode is ensured by displaying the barcode diagonally. This technique displays the barcode with the greatest length possible in the display.

In another aspect of the invention, the barcode includes redundant information and the barcode is displayed without at least some of the redundant information. The technique takes advantage of the fact that the display device produces a perfectly-rendered barcode. In the present context, redundant information is any information contained in the barcode which is not required by the barcode reader to either locate the barcode or to read the barcode's message. Redundant information may include but is not limited to information which repeats all or part of the message, location information which is not needed to locate the barcode, or information which may be used to correct errors made in reading the displayed barcode.

In another aspect, maximum readability of the barcode is ensured in a device which includes a pixel display and which can display an image of a barcode using a number of possible image forms. The device is characterized in that the device displays an image form which has the property that the displayed image form is readable by the barcode reader. The property may result from the orientation of the displayed image form in the display. The orientation may be diagonal. The property may result from the shape of the displayed image form in the display. The shape may be such that redundant information in the barcode is omitted from the display.

In another aspect, maximum readability of the barcode is ensured by a method of displaying an image of a barcode in which an image form of a number of possible image forms of the barcode is determined. The determined image form is readable by the barcode reader as displayed in the pixel display. The determined form is then caused to be displayed in the pixel display. The determined form may have an orientation or a shape that renders it readable when displayed in the pixel display and may omit redundant information contained in the barcode.

In a still further aspect, maximum readability is ensured by a method of making a minimum pixel representation of a barcode in which the elements of the barcode are represented using the minimum possible number of pixels, determining the number of pixels required in the display to represent the minimum element size for the element, and making a pixel representation in which the minimum pixel representation is expanded by multiplying the minimum pixel representation by an integer such that the elements of the pixel representation have the minimum element size.

BRIEF DESCRIPTION OF THE SEVERAL VIEWS OF THE DRAWINGS

FIG. 1 shows images helpful to understanding the problem the invention is addressing.

FIG. 4 shows examples of sample barcode manipulations.

FIG. 6 shows examples of sample barcode manipulations for a 2-D DataMatrix barcode.

DETAILED DESCRIPTION OF THE INVENTION

Overview of the Invention

Figure 2:
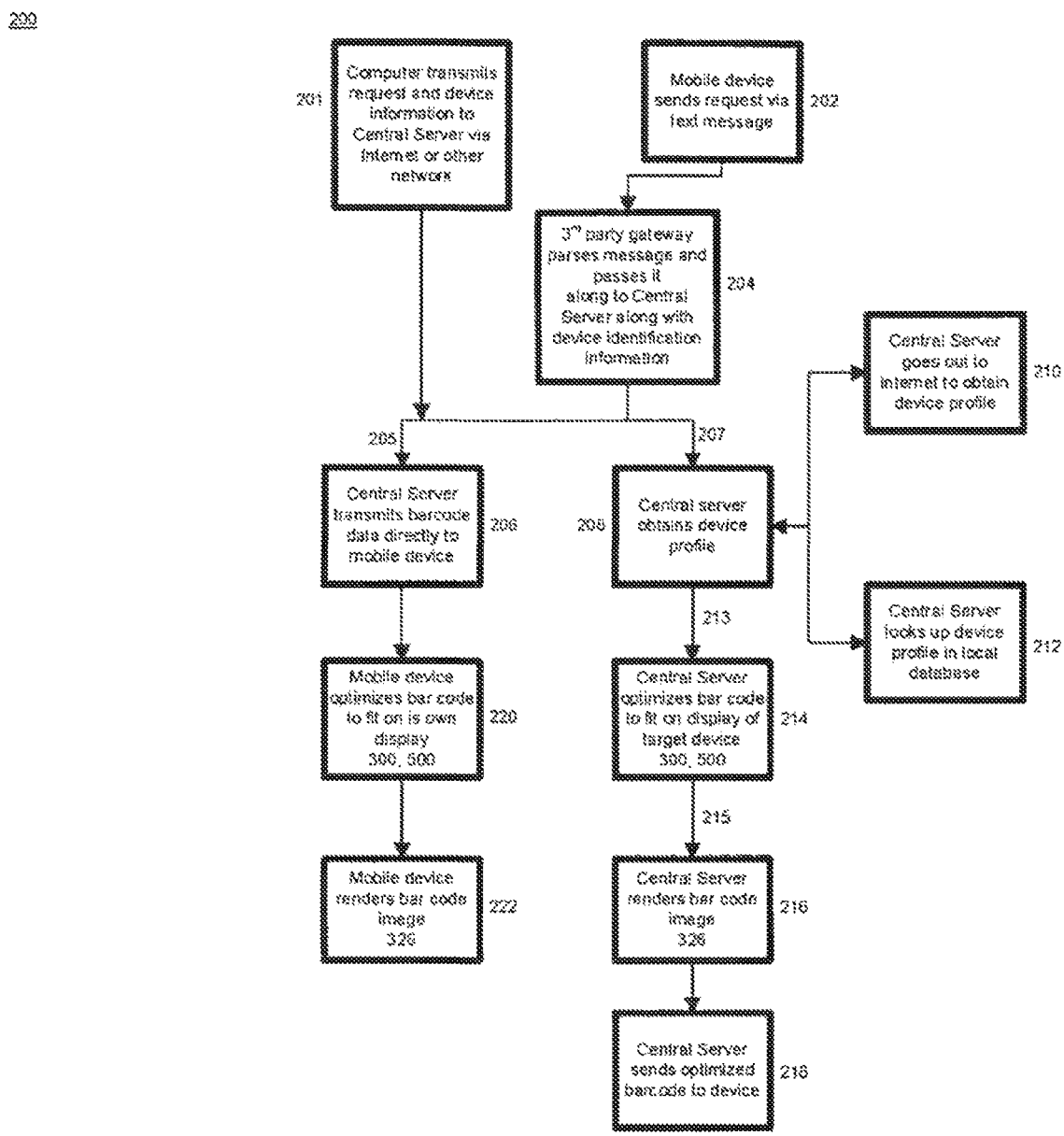
FIG. 2 is a system overview for rendering a barcode on a pixel display.

The solution to the problem of sizing a barcode that is displayed in a pixel display in order to ensure maximum readability of the barcode by a barcode reader has three parts.

The first part is to orient/rotate the barcode in the display so that it can be sized for maximum readability. Three different possibilities are shown in FIG. 4:

1) display the code horizontally as shown in 402
2) display the code vertically as shown in 404
3) Rotate/orient the barcode so that it is displayed diagonally on the display as shown in 406, 408, 410, and 412. What is meant by diagonal in the present context is any orientation of the barcode in which the barcode is not parallel to the sides of the display.

The second part of the solution is to expand the barcode so that it is readable by the barcode reader.

The third part of the solution involves enabling further expansion of the displayed barcode by one or more of the following methods:

Method A) Reducing or eliminating redundant and error correction portions of the barcode (608, 610), Method B) Changing the geometry of the barcode (604, 606), Method C) Reducing the amount of location information needed to locate the barcode.

Method A works because the pixel display is capable of displaying the barcode accurately 100% of the time and thus it may be possible for redundant and error correction data to be removed from the barcode and still ensure that the barcode scanner can accurately read the barcode. The amount of data that can be removed from the barcode depends upon the specific nature of the barcode. Method B) works because certain barcode formats such as DataMatrix have both square and rectangular geometry, and Method C) works because on most pixel displays, the software rendering the barcode can ensure that no other data is displayed at the same time the barcode is displayed. This makes it possible to eliminate some of the location information and reduce other of the location information.

The ultimate solution leverages one or more of the above mechanisms for a given display or barcode type. The image of the barcode that is to be displayed can be made and/or stored on a central server and delivered to the mobile device, or the central server can provide information to the mobile device which permits the mobile device to generate the barcode image locally. An example of such information is the sequence of numbers and digits represented by the barcode.

Determining the Display Width for a Barcode's Elements in a Particular Display

Definitions of and methodologies for how 1-D and 2-D barcodes must be rendered are well known and can be found in a number of locations. When a barcode is to be displayed in a pixel display device, the rendering for the barcode must be mapped onto pixels such that each element of the barcode has an integer pixel size and each element also has the display size required by the barcode reader. As described above, the UPC barcode (102), a 1-dimensional barcode, encodes 12 decimal digits as S$\underline{\text{LLLLLL}}$M$\underline{\text{RRRRRR}}$E, where S (start 104) and E (end 112) consist of three elements, M (middle 108) (element M is known as guard bars) has five elements, each L 106 has seven elements, and each R 110 also has seven elements. The grand total of elements required is (3+(6×7)+5+(6×7)+3) or 95 elements. The shortest possible rendering of a UPC barcode on a given pixel display device will thus have a width of 95 pixels, one for each of the 95 elements. A barcode's width when it is displayed which each element having a width of 1 pixel is termed in the following the barcode's minimum length in pixels, or minimum pixel length. The minimum pixel length for a UPC barcode is thus 95 pixels.

Creating the Image of a Barcode on a Mobile Device's Pixel Display: FIG. 2

FIG. 2 shows an example system overview for rendering a barcode in a pixel display for a mobile device. The technique can of course be used with any pixel display. The process for requesting a barcode can begin in a number of ways, including from a computer attached to the internet or other network (block 201) or directly from the mobile device to which the barcode will be delivered (block 202). If the request comes from the mobile device (block 202), a 3$^{rd}$ party gateway will parse the incoming message and pass it along to a Central Server along with device identification information (block 204). If the request is initiated via computer, the computer will request the phone number or other identifier for the mobile device and the device identification information and will pass this information along via network or internet to a Central Server. At this point, there are two possible paths for rendering the barcode 205, and 207.

Path 205 begins the process if the barcode is to be rendered directly on the mobile device by software running on the mobile device. Path 207 begins the process if the barcode is to be rendered on a Central Server and then transmitted to the mobile device.

Following path 207, the Central Server can obtain the device profile 208 in a number of ways, including the methods described at 210 and 212 and further detailed below.

The Device Description Working Group from the Mobile Web Initiative of the W3C group has worked on a recommendation called the Composite Capability/Preferences Profiles ("CC/PP"). This recommendation utilizes the RDF (Resource Description Framework (see http://www.w3.org/RDF/)) as the implementing (enabling) technology for the description of presentation capabilities of the target device (http://www.w3.org/TR/2004/REC-CCPP-struct-vocab-20040115/). The Appendix F of this release contains two pages describing the concept of personalization through a communications protocol. (See http://www.w3.org/TR/2004/REC-CCPP-struct-vocab-20040115/#Appendix_F including the figure F-1.)

Both of the following methods involve obtaining the device's name/type from an incoming message header (which contains a reference to the device profile as described in the CC/PP recommendation above) when the device contacts the Central Server, and then either:

A) Method 1 (210) Going out to the Internet to obtain the device profile using the URL reference contained in the message header, and then storing the device information such as height, width, and pixels per inch of the device's display in the Central Server database associated with that particular device type (but not the phone number), or B) Method 2 (212) Comparing the received data against a pre-populated database of device information which contains additional device information such as height, width, pixels per inch of the device's display.

Of course, any other available method could be used to provide the server with the information about the mobile device that the server needs to produce the image of the barcode for the mobile device. Examples of other methods include but are not limited to:

Querying the mobile device to obtain the necessary information; and

Receiving input from the user via the Web about the mobile device's display capabilities.

Figure 3:
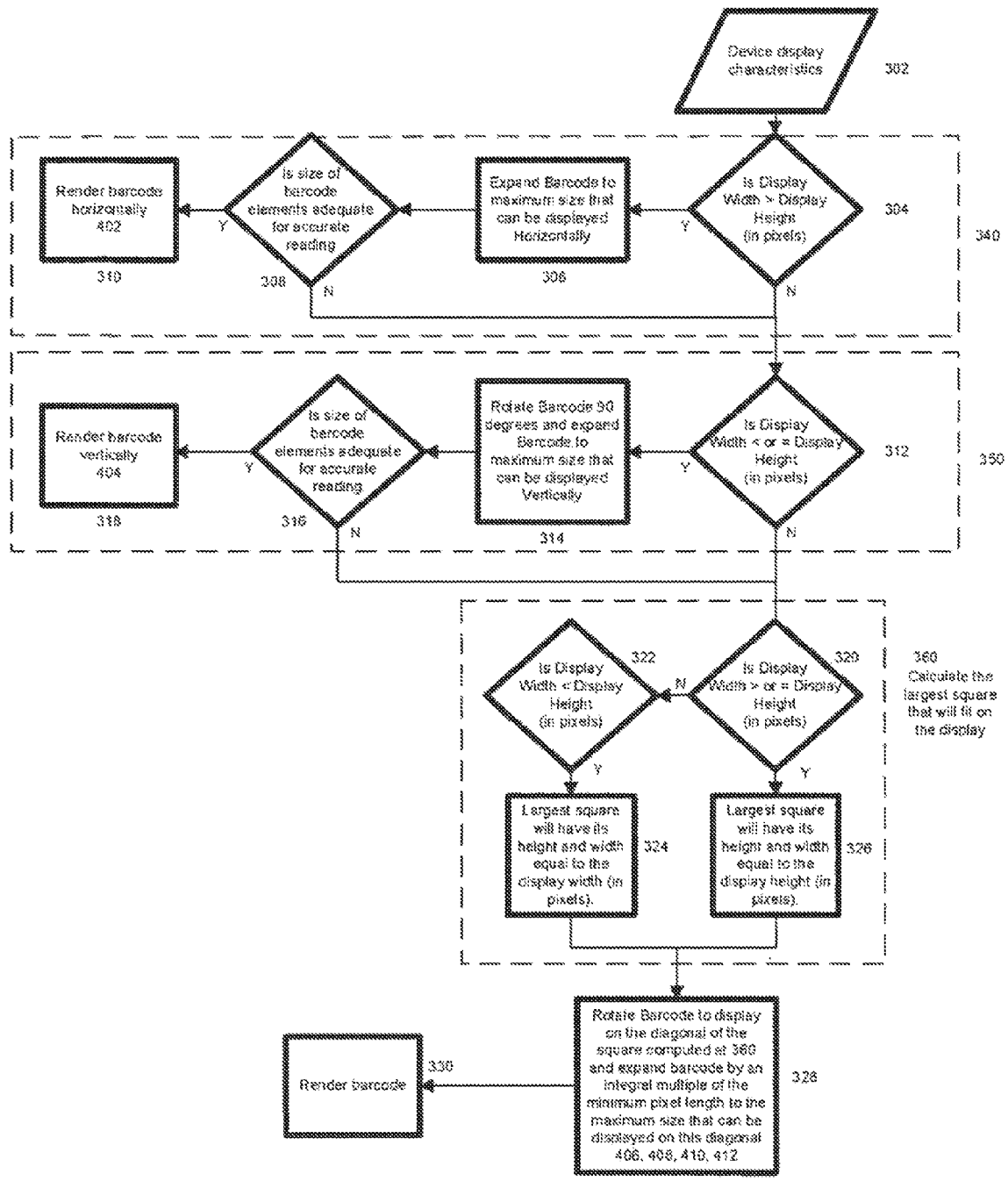
FIG. 3 shows sample logic for optimizing a barcode for a given pixel display.

Following path 213, once the Central Server has obtained the device display characteristics, it optimizes the barcode (214) to fit on the screen of the target device and renders the final barcode image (216) using the methodology described in FIG. 3 to form a barcode as shown in the examples in FIG. 4.

At the final step in this process 218, the Central Server sends the optimized barcode to the device.

Returning to path 205, that path describes an alternative method for the rendering the barcode. In this case, the central server transmits the information the mobile device needs to generate the barcode's image directly to the mobile device (block 206). As indicated above, the information may simply be the string of digits and numbers represented by the barcode. Next, software running on the mobile device which has access to the device's own screen display characteristics optimizes the barcode (220) to fit on the screen of the target device and renders the final barcode image (222) using the methodology described in FIG. 3 to form a barcode as shown in the examples in FIG. 4.

As an alternative method to those described above under paths 205 and 207, the Central Server may send the barcode data and additional data regarding screen display characteristics of the mobile device directly to the mobile device, and software running on the mobile device can then use this data to optimize and render the final barcode image using the logic described in FIG. 3.

Although the invention is described above with the optimal barcode created on the fly, other ways of creating the optimal barcode can be used without departing from the spirit and scope of the invention. For example, sets of images of different sizes for each barcode to be generated are pre-compiled for particular display characteristics and stored. When the system receives a request from the mobile device for the barcode, the system selects the barcode image from those stored which is optimal for the display characteristics of the mobile device. This selected barcode image can then be sent to the mobile device.

For another example, pre-compiled barcode images are generated and stored in a database, along with corresponding mobile device identifiers. These pre-compiled images (one per mobile device) are deemed optimal for the display characteristics of the assigned mobile device. When the system receives a request from the mobile device for the barcode, the system selects the image in the database with a matching mobile device identifier.

For another example, establishment of optimal barcode image scaling factors for every supported mobile device may be used to either pre-compile or generate bar codes in real time. The optimal scaling factors may also depend on the bar code type and the target scanning device. When the system receives a request from the mobile device for the barcode, the system selects the scaling factor matching the mobile device identifier. The system then returns the barcode image matching the selected scaling factor. Such image may be pre-compiled (generated prior to the request), or generated in real time.

For another example, the system may return a set of barcode images of different sizes either all at once or one at a time. Such images are displayed in a pre-determined order which could also be deemed random until the readable image is encountered. The readability may be determined within the mobile device, through interaction of the mobile device with any of its attachments, through a barcode scanner scanning the image, through a 3$^{rd}$ party device interacting with the mobile device, or through a user interacting with the application displaying the barcode image.

For another example, generating a set of barcode images of different sizes per mobile device combined with readability tests results (e.g., target scanning device scans the returned bar code image easily) may be used to pre-compile optimal bar codes. Such selected images are mapped to the corresponding mobile device identifiers. When the system receives a request from the mobile device for the barcode, the system selects the image matching the mobile device identifier.

Optimizing the Image of the Barcode: FIG. 3

As described above, the optimization may be done at the server or in the mobile device; it may further be done for each barcode that is to be displayed on the device, once for each class of barcode, for example once for UPC barcodes, or once for the device. In one embodiment, the optimization would be done for the largest barcode to be displayed on the device and smaller barcodes would employ the same optimization, with a portion of the optimization for the largest barcode being used to display the elements of a smaller barcode. Moreover, the order of the steps described at 340 and 350 can be interchanged.

The first step of the method of FIG. 3 is to obtain the characteristics of the mobile Device's display (302), Next, at step 340, the method determines if the width in pixels (horizontal size) of the mobile device's display is greater than the height of the display (in pixels) as shown at 304. If the width is greater than the height, then the barcode is expanded at 306 to the maximum size that can be displayed horizontally on the device's display by increasing its length by an integral multiple (100%, 200%, 300%, etc.) of the barcode's minimum pixel length. At this point, another test is performed 308 to determine if the size of the barcode's elements after the multiplication will permit accurate reading by a barcode reader. If test 308 is true, then render the barcode horizontally as shown in 402.

As an example of 340, assume the user has a display that is 1.2" wide×1.0" high and has 110 horizontal pixels×80 vertical pixels. In this example, the width of the display (in pixels) is greater than the height, and the size of the pixels is 1.2"/110=~11 mils, which is sufficient for the elements to be accurately read, so no multiplication of the minimum pixel length is required. The barcode code can thus be oriented horizontally as in 402.

If the step described by 340 does not produce a barcode that can be, accurately read by a barcode reader, then the process continues to step 350 to determine if the width (horizontal size) of the display screen in pixels is less than or equal to the height of the display (in pixels) as shown at 312. If the width is less than or equal to the height, then the barcode is rotated 90 degrees and then expanded at 314 to the maximum size that can be displayed vertically on the device's display by multiplying the minimum pixel length by an integral amount (100%, 200%, 300%, etc.). At this point. another test is performed 316 to determine if the size of the barcode's elements will permit accurate reading by a barcode reader. If test 316 is true, then render the barcode vertically as shown in 404.

As an example of 350, assume the user has a display that is 1.0" wide×1.2" high and has 110 vertical pixels ×80 horizontal pixels. In this example, the height of the display (in pixels) is greater than the width, and the size of the pixels is 1.2"/110=~11 mils. This would mean orienting the code vertically as in 404. The element size of 11 mils is sufficient for barcode readers to accurately read, so this method solves the display problem for this display.

If the steps described by 340 and 350 do not provide a result that makes the barcode readable, then proceed to step 360 and calculate the largest square that will fit on the display as shown at 411. At 320, test to see if the display's width in pixels is greater than or equal to the display's height in pixels. If it is, then continue to step 326 and set the height and width of the largest square to the display height (in pixels). If the test at 320 returns false, then continue on to step 322 to test if the display's width in pixels is less than the display's height in pixels. If it is. then continue on to step 324 and set the height and width of the largest square to the display height (in pixels). Continuing to step 328, rotate the barcode so that it is oriented diagonally (406, 408, 410, 412) within the square computed at 320 and then expand the barcode by an integral multiple of the minimum pixel length to the maximum size that, can be displayed on this diagonal and then render the barcode 330. The following examples and figures illustrate sample methods for orienting 1 dimensional barcodes diagonally.

Method A) If numbers or an orientation arrow must be displayed with the code (406, 408, 414) then rotate the barcode some number of degrees so that the bottom of the code is oriented to point from corner to corner of the largest square as shown in 406 and then truncate the portions of the image that lie outside the visible area of the display. Alternatively, the barcode can be made to appear rectangular by truncating additional portions of the image as shown in 408, 412, and 414.

Method B) If numbers or an orientation arrow are not to be displayed with the code, then rotate the barcode some number of degrees so that the center of the code is oriented to point from corner to corner of the largest square as shown in 410 and then truncate the portions of the image that lie outside the visible area of the display. Alternatively, the barcode can be made to appear rectangular by truncating additional portions of the image as shown in 412. In either case, the truncation can provide space for the barcode's value, as in 408, or an orientation, arrow, as in 414.

The methods described in FIG. 3 will use the information regarding the device's display characteristics to ensure that when the barcode is oriented diagonally, the shortest bar will be at least as high as that required a) by the standard, if any for the type of barcode being rendered, and b) by common barcode readers available for purchase in the marketplace. It should also be noted that the exact vertical display position of the largest square in displays which have their height>their width (in pixels) as shown in 410, 412, and 414 will not affect the readability of the barcode. Similarly, the exact horizontal display position of the largest square in displays which have their height<width (in pixels) will not affect the readability of the code.

Although the embodiment above is described in the context of, a mobile device display with the optimal image being the largest image for the display, the largest image need not be used on any display mobile or otherwise, as long as the maximum readable scaling does not exceed the desired scanner handling. For example, if the optimal scanning distance for a particular scanner is eight inches and at that distance the optimum image size is two square inches? This might suggest that the barcode should be displayed at three times its minimum pixel length even if the display is capable of displaying the image at 5 times the minimum pixel length.

Figure 5:
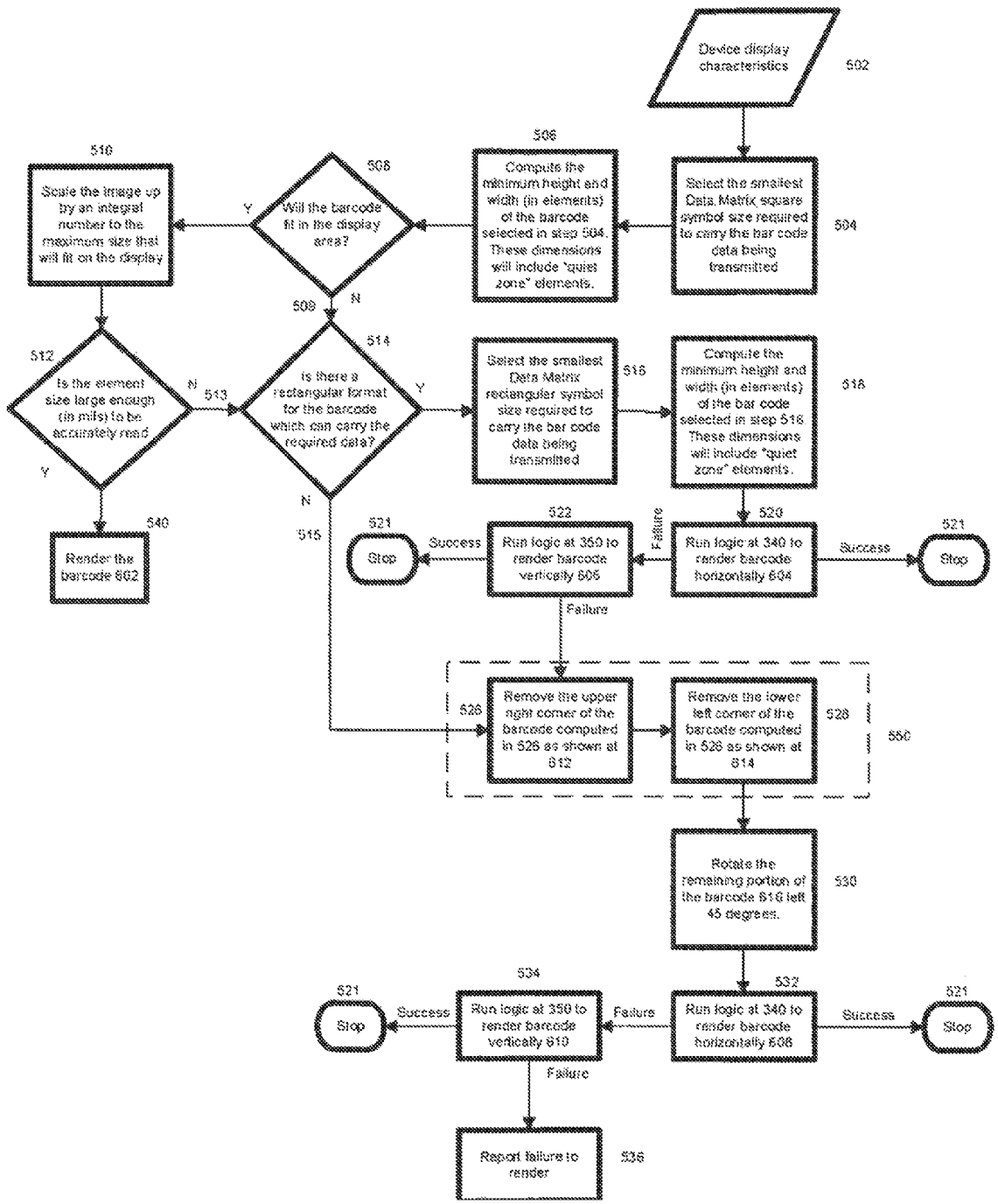
FIG. 5 is a system overview for rendering a 2-D barcode on a pixel display.

Applying the Techniques to 2-D Barcodes: FIGS. 5 and 6

FIGS. 5 and 6 describe a sample method and results of applying the above techniques to a 2-D barcode. FIGS. 5 and 6 also describe two additional techniques that may be applied to 2-D barcodes to enhance their readability on pixel displays: a) a change in the geometry of the barcode which is allowed by certain 2-D barcode formats such as DataMatrix, and b) the removal of redundant information from the bar code in order to decrease the overall number of elements in the barcode and therefore the size of the barcode. The specific sample method described below works for DataMatrix barcodes for the following reasons:

The method removes approximately equal amounts of user and error correction data, allowing the remaining error correction data to account for the lost user data.

The method leaves enough of the barcode's location information intact to clearly establish the boundaries of the original DataMatrix square.

It should be noted that DataMatrix bar codes have a few properties that enable some of the methods described below:

The barcode can be displayed with a variable number of elements depending upon the amount of data which is to be contained in the code. For example, a DataMatrix code which contains 20 bytes of data will have fewer elements than a DataMatrix code which contains 40 bytes of data.

The barcode can be displayed as either a square or a rectangle.

The square versions of the DataMatrix barcode can contain more data than the rectangular versions, so depending upon the amount of data to be carried, there may not be a rectangular version of the code that can contain all of the required data.

The DataMatrix barcode contains redundant data so that if a portion of the Barcode's elements are damaged, the barcode's message can still be accurately read. Because the barcode as displayed on a pixel device should never contain any damaged elements, a portion of this redundant data may be removed and the barcode can still be accurately read.

The DataMatrix barcode distributes the data for the message above the diagonal drawn from lower left to upper right and redundantly distributes the error correcting codes for the message below the same diagonal.

The Quiet Zone of the DataMatrix barcode can have a variable size.

FIG. 5 shows sample logic for optimizing a 2-D barcode and FIG. 6 shows sample results for a 2-D DataMatrix barcode containing the data "DataMatrix ECC200". Once the device display characteristics have been obtained (502). The first step to optimizing a 2-D barcode is described at step 504: the smallest DataMatrix barcode symbol size which can contain the required data is selected. The next step 506 computes the minimum height and width (in elements) of the barcode selected in step 504. In this computation, each element is treated as having a size of 1 pixel. The minimum height and width will include elements representing the "quiet zone" which is a part of the DataMatrix symbol structure and the locator information which occupies the outside edges of the DataMatrix symbol structure.

The quiet zone consists of elements that are at least 1 element wide that surround the entire barcode. These elements are white for common dark-on-light representation, where white elements denote 0, and black elements denote 1. The primary purpose of the quiet zone is to ensure that the barcode reader does not accidentally read data that is not part of the barcode. The locator information is a row of dark pixels on two adjacent sides of the barcode and a row of alternating light and dark pixels on the other two adjacent sides. If the resulting minimum representation of the barcode will fit in the display area (508), then scale the image up by an integral number to the maximum size that will fit on the display (510). If the element size in mils is large enough to be accurately read (512), then render the barcode as shown in 602.

If the barcode will not fit in the display area (508) or cannot be expanded to a size that will allow it to be accurately read (510, 512), then continue to step 514 to determine if there is a rectangular format of the barcode which can carry the required data. If there is not, then proceed along path 515 to step 526 (described below). If there is, then continue to step 516 and select the smallest DataMatrix rectangular symbol size required to carry the barcode data being transmitted. Next, at 518, compute the minimum height and width (in elements) of the bar code selected in step 516. These dimensions will include "quiet zone" elements. At this point (step 520), run logic similar to that described in FIG. 3 at 340 to determine if the barcode can be expanded and displayed horizontally in such a manner as to allow it to be accurately read. If it can be, then display the barcode horizontally as shown in 604.

If the barcode cannot be accurately read when displayed horizontally, then proceed to step 522 and run logic similar to that described in FIG. 3 at 350 to determine if the barcode can be rotated and expanded to display vertically in such a manner as to allow it to be accurately read. If it can be, then display the barcode vertically as shown in 606. If the barcode cannot be accurately read when displayed vertically then proceed to step 526.

Step 526 and 528 describe a sample method for removing redundant elements from a DataMatrix barcode. These elements can be removed because the DataMatrix barcode is designed with redundant data. Methods for removing redundant data and shrinking the size of the barcode other than those described at 526 and 528 may be possible for DataMatrix and other 2-D barcodes.

Continuing on to step 526, remove the upper right corner of the barcode computed in 506. It has been empirically determined that the dimensions of the area to be removed can be computed as follows:

- Draw a vertical line (630) starting at the point which is ⅓ of the width of the barcode from the right side of the barcode
- Draw a horizontal line (624) starting at the point which is ⅓ of the height of the barcode from the top of the barcode
- Draw a line (622) which bisects the square which is formed in the upper right hand corner.
- Remove the top portion of the square shown at 612.

Continuing on to step 528, remove the lower left corner of the barcode computed in 506. The dimensions of the area to be removed can be computed as follows:

- Draw a vertical line (628) starting at the point which is ⅓ of the width of the barcode from the left side of the barcode
- Draw horizontal line (626) starting at the point which is ⅓ of the height of the barcode from the bottom of the barcode
- Draw a line (618) which bisects the square which is formed in the lower left hand corner.
- Remove the bottom portion of the square shown at 614
- The resultant barcode will be contained in area 616. Continuing on to step 530, rotate the resultant barcode (616) left by 45 degrees. The barcode will now appear as shown in 608.

At this point (step 532), run logic similar to that described in FIG. 3 at 340 to determine if the barcode can be displayed horizontally in such a manner as to allow it to be accurately read. If it can be, then expand and display the barcode horizontally as shown in 608. It should be noted that this barcode (608) is shorter than the 20×20 barcode (602) and narrower than the 12×36 barcode (604), potentially allowing it to be displayed on a smaller display (as measured in pixels).

If the resulting barcode cannot be accurately read when displayed horizontally, then proceed to step 534 and run logic similar to that described in FIG. 3 at 350 to determine if the barcode can be rotated and expanded to display vertically in such a manner as to allow it to be accurately read. If it can be, then display the barcode vertically as shown in 610. It should be noted that this barcode (610) is shorter than the 12×36 barcode (606) and narrower than the 20×20 barcode (602), potentially allowing it to be displayed on a smaller display (as measured in pixels).

If the resulting barcode can not be accurately read when displayed vertically then proceed to step 536 and report failure. It should be noted that for certain types of barcodes, such as the Aztec format, a new step 535 could be inserted into the above process which would recalculate another form of the barcode with a reduced level of built-in error correction (Reduced ECC Barcode), thereby further decreasing the minimum barcode symbol size which can contain the required data. This Reduced ECC Barcode could then traverse a similar process beginning at step 504 to maximize its readability. Again, this method works because on a pixel display, there should be no errors introduced when rendering, and as a result, error correction data can be minimized or eliminated and the resultant barcode can still be accurately read by a barcode scanner. Finally, the methods described in FIG. 5 could also remove a portion of the "quiet zone" in the above example to further reduce the size of the barcode and still allow it to be accurately read by a barcode reader.

It should be noted here that the techniques described above for optimizing the display of a barcode in a pixel-based display for reading by a barcode reader can be applied in any situation in which a barcode is displayed in a pixel-based display. For example, as mobile devices with built-in digital cameras become common, a store display might include a barcode for a discount or other offer and a person interested in the discount might use the built-in digital camera to photograph the barcode. Standard image processing techniques could then be used to determine the barcode from the photograph and the optimization techniques just described could then be used to display an optimized form of the barcode on the mobile device's display for reading by a barcode reader at the cash register.

The technique described above for computing the minimum size of a barcode which is readable by the barcode reader can also be used in any situation in which a barcode must be sized. For example, the need for the user or a clerk to properly orient the barcode reader to the display of the barcode can be eliminated by sizing the barcode so that it fits within the shortest dimension of the display and then slowly rotating the barcode in the display. When the rotation of the barcode results in an orientation that is usable by the reader, the reader will be able to read the barcode.

Although the technique is described above in the context of DataMatrix and Aztec format barcodes, similar techniques can be used with other types of 2D barcodes without departing from the spirit and scope of the present invention. Such 2D barcodes include, but are not limited to, the PDF417 format, in which case parameters can be adjusted such as the amount of error correction, the inclusion of the stop pattern and right row indicator codewords, the encoding scheme if only numbers are part of the code, and the number of data codeword columns can be adjusted to display an optimized PDF417 bar code.

Conclusion

The foregoing Detailed Description has disclosed to those skilled in the relevant technologies how to use the inventive techniques for ensuring maximum readability of barcodes displayed in pixel displays and has further disclosed the best modes presently known to the inventors of implementing their techniques. It will be immediately apparent to those skilled in the relevant technologies that the inventive techniques are general and can be applied to barcodes of all types, not just to the types to which the techniques are applied in the Detailed Description; it will also be immediately apparent that the application of the techniques to a particular type of barcode will depend strongly on the characteristics of the barcode, on the characteristics of the display device on which the barcode will be displayed, and on the characteristics of the barcode readers that will be reading the barcode. Application of the techniques may also depend on the environment in which the barcode display and reading are being done.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

We claim:

1. A method of displaying an image of a barcode in a pixel display belonging to a device, the method comprising the steps of:
  identifying, based on characteristics of the pixel display, a plurality of possible image forms of the barcode for the pixel display, wherein in at least one of the possible image forms includes a barcode wherein:
    i. the barcode has a minimum display size in pixels which renders each element of the barcode readable by a barcode reader from the pixel display;
    ii. each element of the barcode has a minimum element size in the pixel display and the barcode has a minimum size in which every element of the barcode is its minimum element size,
    iii. a display size of the barcode on the pixel display is an integer multiple of the minimum size of the barcode and is at least equal to the minimum display size;
  selecting and generating an image form from the plurality of possible image forms of the barcode, the selected and generated image form being readable as a barcode, when displayed in the pixel display and read from the pixel display by a barcode reader such that the barcode reader can extract barcode information from the image form, as displayed in the pixel display of the device; and
  causing the selected image form to be displayed in the pixel display.

2. The method of displaying an image of a barcode in a pixel display of claim 1, wherein: the plurality of possible image forms differ in orientation in the display.

3. The method of displaying an image of a barcode set forth in claim 2 wherein: the orientation of the selected image form is diagonal with regard to the pixel display.

4. The method of displaying an image of a barcode set forth in claim 3 wherein:
  the barcode is a 1-dimensional barcode; and
  the elements of the barcode in the selected image form are truncated for the diagonal orientation.

5. The method of displaying an image of a barcode set forth in claim 1 wherein: a possible image form has a minimum display height in pixels and a minimum display length in pixels which render the possible image form readable by the barcode reader.

6. A method of displaying an image of a barcode in a pixel display belonging to a device, the method comprising the steps of:
  identifying, based on characteristics of the pixel display, a plurality of possible image forms of a barcode for the pixel display;
  selecting and generating an image form from the plurality of possible image forms of the barcode, the selected and generated image form being readable as a barcode, when displayed in the pixel display and read from the pixel display by a barcode reader such that the barcode reader can extract barcode information from the image form as displayed in the pixel display of the device; and
  causing the selected image form to be displayed in the pixel display;
  wherein a possible image form has a minimum display height in pixels and a minimum display length in pixels which render the possible image form readable by the barcode reader;
  wherein the barcode is a one-dimensional barcode; and
  a display length of the barcode is an integer multiple of a minimum length of the barcode, the minimum length being a length such that every element of the barcode is a single pixel wide, and the display length is at least equal to the minimum display length.

7. The method of displaying an image of a barcode set forth in claim 6 wherein:
  an element of a barcode which is readable by a barcode reader has a minimum element width; and
  the minimum display length is an integer multiple of the minimum length such that the width in pixels of each element of the barcode in the possible image form is at least equal to the minimum element width.

8. The method of displaying an image of a barcode set forth in claim 1 wherein:
  the selected image form reduces redundant elements in the barcode.

9. The method of displaying an image of a barcode set forth in claim 8 wherein:
  the selected image form employs a form of the barcode which has fewer redundant elements.

10. The method of displaying an image of a barcode set forth in claim 8 wherein:
  the selected image form omits redundant elements of the barcode.

11. The method of displaying an image of a barcode set forth in claim 1 wherein:
  the plurality of possible image forms differ in their shapes.

12. The method of displaying an image of a barcode set forth in claim 11 wherein:
  the shapes include a shape in which redundant elements of the barcode are omitted.

13. The method of displaying an image of a barcode set forth in claim 1 wherein:
  the barcode is a two-dimensional barcode which may have different shapes.

14. The method set forth in claim 1 wherein the device to which the pixel display device belongs is connected to a server via a network and the method further comprises the receiving a value to be represented by the barcode from the server.

15. A method of making a pixel representation of a one-dimensional barcode for a pixel display such that when the pixel representation is displayed in the pixel display, the barcode is readable by a barcode reader from the pixel display, the method performed by a processor of a device having the pixel display and comprising the steps of:
  the processor determining a minimum length of a one-dimensional barcode to be displayed on a pixel display for reading by a barcode reader, wherein each element of the one-dimensional barcode has a width of 1 pixel in the pixel display;
  the processor determining a minimum element width which each element of the one-dimensional barcode must have when displayed on the pixel display to be readable by the barcode reader; and
  the processor generating the pixel representation by multiplying the minimum length by an integer amount such that the width in pixels of each element of the barcode in the pixel representation results in an element width of the element as displayed in the pixel display which is at least equal to the minimum element width,
  the processor causing the generated pixel representation to be displayed on the pixel display,
  wherein the displayed pixel representation is readable by the barcode reader as a barcode from the pixel display such that the barcode reader can extract barcode information from the generated pixel representation as displayed on the pixel display.

16. A method of making a pixel representation of a two-dimensional barcode for a pixel display such that when the pixel representation is displayed in the pixel display, the barcode is readable by a barcode reader from the pixel display, the method performed by a processor of a device having the pixel display and comprising the steps of:
- the processor determining a minimum size of a two-dimensional barcode in which each element of the two-dimensional barcode has a minimum size in pixels;
- the processor determining a minimum display size which each element of the two-dimensional barcode must have when displayed on the pixel display to be readable by the barcode reader; and
- the processor generating the pixel representation by scaling the minimum size by an integer amount such that the size in pixels of each element of the barcode in the pixel representation results in an element size of the element as displayed in the pixel display which is at least equal to the minimum display size,
- the processor the generated pixel representation to be displayed on the pixel display of the device,
- wherein the displayed pixel representation is capable of being read by the barcode reader as a barcode from the pixel display such that the barcode reader can extract barcode information from the generated pixel representation as displayed on the pixel display.

17. A device for displaying a barcode for reading by a barcode reader, comprising:
- a pixel display; and
- a processor in communication with the pixel display configured to:
  - identify a plurality of possible image forms for displaying a barcode on the pixel display, wherein at least one of the possible image forms has a barcode wherein:
    - i. the barcode has a minimum display size in pixels which renders each element of the barcode readable by a barcode reader from the pixel display;
    - ii. each element of the barcode has a minimum element size in the pixel display and the barcode has a minimum size in which every element of the barcode is its minimum element size,
    - iii. a display size of the barcode on the pixel display is an integer multiple of the minimum size of the barcode and is at least equal to the minimum display size; and
  - select and generate an image form from the plurality of possible image forms of the barcode, the selected image form being readable as a barcode, when displayed in the pixel display and read from the pixel display by a barcode reader such that the barcode reader can extract barcode information from the image form as displayed in the pixel display of the device;
  - wherein the pixel display displays the selected image form.

18. The device set forth in claim 17 wherein the displayed image form has an orientation in the pixel display such that the displayed image form is readable by the barcode reader.

19. The device set forth in claim 18 wherein the orientation of the displayed image form is diagonal.

20. The device set forth in claim 17 wherein:
- the barcode includes redundant information; and
- the displayed image form employs a form of the barcode which has fewer redundant elements.

21. The device set forth in claim 17 wherein:
- the barcode includes redundant information;
- and the displayed image form omits at least part of the redundant information.

22. The device set forth in claim 17 wherein:
- the plurality of possible image forms have different shapes; and
- the shape of the displayed image form is such that the displayed image is readable by the barcode reader.

23. The device set forth in claim 22 wherein the shape of the displayed image form is such that redundant information in the barcode is omitted from the displayed image form.

24. A device for generating readable barcodes for display on a mobile device, comprising:
- a processor configured to:
  - receive data to be encoded as barcode information according to barcode characteristics;
  - determine, according to the barcode characteristics and characteristics of the display of the mobile device, sizes of barcode elements on the display of the mobile device, wherein:
    - i. the barcode has a minimum display size in pixels which renders each element of the barcode readable by a barcode reader from the display;
    - ii. each element of the barcode has a minimum element size in the display and the barcode has a minimum size in which every element of the barcode is its minimum element size,
    - iii. a display size of the barcode on the display is an integer multiple of the minimum size of the barcode and is at least equal to the minimum display size; and
  - generate an image that includes the readable barcode with elements of barcode information of the determined size, such that when the image is displayed on the display and read from the display by a barcode reader, the barcode reader can extract the barcode information from the image as displayed on the display.

25. The computer system of claim 24, wherein the processor is further configured to generate the image such that the barcode is oriented diagonally with respect to edges of the pixel display.

26. The computer system of claim 25, wherein the barcode is oriented at a forty-five degree angle with respect to edges of the pixel display.

27. A device for generating readable barcodes for display, comprising:
- one or more processors configured to:
- receive data indicative of a display;
- receive data to be encoded as barcode information according to barcode characteristics;
- in response to receiving the data to be encoded and the indication of the display, produce an image that includes a readable barcode with barcode elements encoding the received data, by:
- generate barcode elements of the barcode encoding the received data in the image, such that the barcode has a size in pixels in the image that is:
  - a. an integer multiple of a minimum size of the barcode in pixels, in which each barcode element in the barcode is a minimum element size for the barcode element in pixels in the display, and
  - b. at least equal to the minimum display size of the barcode in pixels of the barcode which renders each barcode element readable by a barcode reader from a display,
- such that when the produced image is displayed on the display and read from the display by a barcode reader, the barcode reader can extract the data encoded as barcode information from the image as displayed on the display; and
- in response to the processor producing the image, cause the produced image to be displayed on the display.

* * * * *